US010619118B2

(12) United States Patent
Takagi et al.

(10) Patent No.: US 10,619,118 B2
(45) Date of Patent: Apr. 14, 2020

(54) DEFOAMING AGENT AND LUBRICATING OIL COMPOSITION

(71) Applicant: JXTG NIPPON OIL & ENERGY CORPORATION, Tokyo (JP)

(72) Inventors: Akira Takagi, Tokyo (JP); Go Tatsumi, Tokyo (JP); Shingo Matsuki, Tokyo (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 91 days.

(21) Appl. No.: 15/749,919

(22) PCT Filed: Aug. 19, 2016

(86) PCT No.: PCT/JP2016/074297
§ 371 (c)(1),
(2) Date: Feb. 2, 2018

(87) PCT Pub. No.: WO2017/030203
PCT Pub. Date: Feb. 23, 2017

(65) Prior Publication Data
US 2018/0208871 A1    Jul. 26, 2018

(30) Foreign Application Priority Data

Aug. 19, 2015  (JP) ................................ 2015-162255
Aug. 12, 2016  (JP) ................................ 2016-159022

(51) Int. Cl.
*C10M 155/02*    (2006.01)
*C10M 145/14*    (2006.01)
(Continued)

(52) U.S. Cl.
CPC ........... *C10M 155/02* (2013.01); *B01D 19/04* (2013.01); *B01D 19/0409* (2013.01);
(Continued)

(58) Field of Classification Search
CPC ............. C10M 145/14; C10M 147/00; C10M 155/02; C10M 159/005; C10M 159/12;
(Continued)

(56) References Cited

U.S. PATENT DOCUMENTS 4,082,690 A    4/1978  Farminer
4,906,403 A *  3/1990  Berger ............... B01D 19/0409
                                                    516/123

(Continued)

FOREIGN PATENT DOCUMENTS

CA    2359946       7/2000
CN    101263182     9/2008
(Continued)

OTHER PUBLICATIONS

International Search Report of PCT/JP2016/074297, dated Nov. 1, 2016.
(Continued)

*Primary Examiner* — James C Goloboy
(74) *Attorney, Agent, or Firm* — Greenblum & Bernstein, P.L.C.

(57) ABSTRACT

A defoaming agent including a polymer, the polymer including a repeating unit represented by the following general formula (1); and a repeating unit represented by the following general formula (3):

$$-\!\!\left[X^1\right]\!\!-\quad (1)$$
$$\phantom{-\!\!\left[X^1\right]\!\!-}\Big|$$
$$\phantom{-\!\!\left[X^1\right]\!\!-}Z^1$$
$$\phantom{-\!\!\left[X^1\right]\!\!-}\Big|$$
$$\phantom{-\!\!\left[X^1\right]\!\!-}Y^1$$

(Continued)

wherein in the general formula (1), $X^1$ is a repeating unit obtainable by polymerization of a first ethylenic unsaturated group; $Y^1$ is a side chain including a linear or branched polysiloxane structure, the polysiloxane structure having a polymerization degree of 5 to 300; and $Z^1$ is a linking group linking the repeating unit $X^1$ and the side chain $Y^1$;

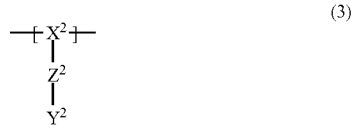

(3)

wherein in the general formula (3), $X^2$ is a repeating unit obtainable by polymerization of a second ethylenic unsaturated group, $Y^2$ is a $C_{1-30}$ hydrocarbyl side chain; and $Z^2$ is a linking group linking the repeating unit $X^2$ and the side chain $Y^2$.

11 Claims, 1 Drawing Sheet

(51) Int. Cl.

| | | |
|---|---|---|
| *C08F 299/08* | (2006.01) | |
| *C10M 159/12* | (2006.01) | |
| *B01D 19/04* | (2006.01) | |
| *C10M 159/00* | (2006.01) | |
| *C08F 290/06* | (2006.01) | |
| *C10M 169/04* | (2006.01) | |
| *C10M 147/00* | (2006.01) | |

(52) U.S. Cl.
CPC ........ *C08F 290/068* (2013.01); *C08F 299/08* (2013.01); *C10M 145/14* (2013.01); *C10M 159/005* (2013.01); *C10M 159/12* (2013.01); *C10M 169/04* (2013.01); *C10M 147/00* (2013.01); *C10M 2209/084* (2013.01); *C10M 2229/02* (2013.01); *C10M 2229/048* (2013.01); *C10M 2229/051* (2013.01); *C10N 2220/021* (2013.01); *C10N 2230/18* (2013.01); *C10N 2230/68* (2013.01); *C10N 2240/04* (2013.01); *C10N 2240/10* (2013.01)

(58) Field of Classification Search
CPC .......... C10M 169/04; C10M 2209/084; C10M 2229/02; C10M 2229/048; C10M 2229/051; C08F 283/124; C08F 290/068; C08F 299/08; B01D 19/04; B01D 19/049; C10N 2220/021; C10N 2230/18; C10N 2230/68; C10N 2240/04; C10N 2240/10
See application file for complete search history.

(56) References Cited

U.S. PATENT DOCUMENTS

| | | |
|---|---|---|
| 5,766,513 A | 6/1998 | Pillon et al. |
| 2008/0207825 A1 | 8/2008 | Stark |
| 2009/0116808 A1* | 5/2009 | Kyota .................. C08F 218/04 385/141 |
| 2011/0163254 A1 | 7/2011 | Stark |
| 2011/0287206 A1 | 11/2011 | Suwa et al. |
| 2013/0244917 A1* | 9/2013 | Obrecht ............... C10M 169/04 508/444 |
| 2014/0018267 A1 | 1/2014 | Loop et al. |
| 2014/0045053 A1* | 2/2014 | Ichikawa ................ B01F 17/00 429/188 |
| 2015/0218482 A1 | 8/2015 | Ito et al. |
| 2018/0208870 A1 | 7/2018 | Takagi et al. |
| 2018/0223219 A1 | 8/2018 | Takagi et al. |
| 2019/0256790 A1 | 8/2019 | Takagi et al. |

FOREIGN PATENT DOCUMENTS

| | | |
|---|---|---|
| EP | 0632157 A1 | 1/1995 |
| EP | 1182236 | 2/2001 |
| EP | 2617745 A1 | 7/2013 |
| JP | 05-228306 | 9/1993 |
| JP | 8-126801 | 5/1996 |
| JP | 11-209778 | 8/1999 |
| JP | 2000-087065 A | 3/2000 |
| JP | 2002-066206 | 3/2002 |
| JP | 2002-301306 | 10/2002 |
| JP | 2008-120889 A | 5/2008 |
| JP | 2008-542462 | 11/2008 |
| JP | 2009-235252 A | 10/2009 |
| JP | 2012-146762 | 3/2012 |
| JP | 2014-177608 | 9/2014 |
| JP | 2016-016367 | 2/2016 |
| WO | 2008/025718 A2 | 3/2008 |
| WO | 2008-046862 | 4/2008 |
| WO | 2008/055998 | 5/2008 |
| WO | 2017/030201 | 2/2017 |
| WO | 2017/030203 | 2/2017 |

OTHER PUBLICATIONS

International Preliminary Report on Patentability Report of PCT/JP2016/074297, dated Feb. 20, 2018.
ISR of PCT/JP2016/074296 dated Nov. 1, 2016.
IPRP of PCT/JP2016/074296 dated Feb. 20, 2018.
ISR of PCT/JP2018/006536 dated May 1, 2018.
IPRP of PCT/JP2018/006536 dated Aug. 27, 2019.
U.S. OA issued in U.S. Appl. No. 15/749,912 dated Sep. 25, 2019.
U.S. OA issued in U.S. Appl. No. 15/749,904 dated Oct. 11, 2019.
ISR of PCT/JP2016/074295 dated Nov. 1, 2016.
IPRP of PCT/JP2016/074295 dated Feb. 20, 2018.
ISR of PCT/JP2016/074298 dated Nov. 22, 2016.
IPRP of PCT/JP2016/074298 dated Feb. 20, 2018.
Official Action issued in U.S. Appl. No. 15/749,875 dated Aug. 19, 2019.
NOA issued in U.S. Appl. No. 15/749,875 dated Jan. 2, 2020.

* cited by examiner

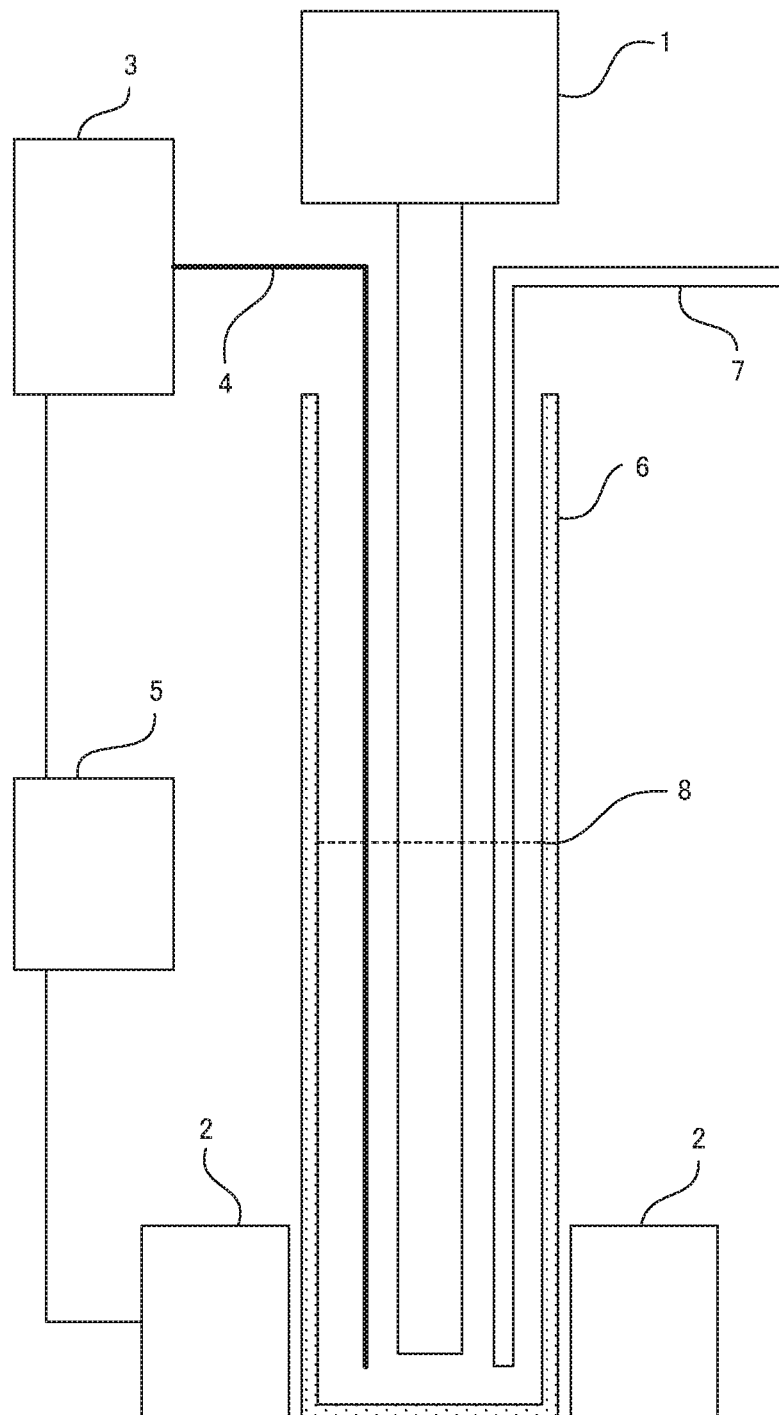

DEFOAMING AGENT AND LUBRICATING OIL COMPOSITION

FIELD

The present invention relates to defoaming agents, and lubricating oil compositions containing the defoaming agents.

BACKGROUND

Lubricating oil is used in various kinds of machinery so as to improve lubricity between members. Increase of foaming of the lubricating oil may lead to insufficient lubrication, failure to control hydraulic pressure, deteriorated cooling efficiency, and so on. Thus, lubricating oil is required to suppress foaming.

For example, automobile engines, transmissions, and axle units are demanding increasingly more from lubricating oil, accompanying their recent improvements in performance and fuel efficiency. Continuous high-load operation or high-speed driving increases foaming in engine oil, transmission oil, or axle unit oil, and as a result, leads to problems such as: failure to control hydraulic pressure due to incorporation of foam in hydraulic circuits; deteriorated lubricating performance or cooling efficiency due to foaming; wear and seizure due to breakage of oil films in friction portions; and promoted deterioration of lubricating oil due to oil temperature increase. Thus, there is demand for engine oil, transmission oil, and axle unit oil which can maintain high defoaming performance so as to suppress foaming for a long time from the initial stage of use.

Generally, lubricating oil contains base oil, and various additives incorporated according to desired characteristics. Example of additives include defoaming agents to prevent foaming of lubricating oil. Polysiloxane defoaming agents (silicone defoaming agents) are conventionally known as defoaming agents. For example, Patent Literature 1 describes a lubricating oil composition formed by incorporating (a) polydimethylsiloxane having kinematic viscosity at 25° C. of 300,000 to 1,500,000 mm$^2$/s, and (b) fluorinated polysiloxane having kinematic viscosity of 25° C. of 500 to 9,000 mm$^2$/s. Patent Literature 2 discloses incorporating polydimethylsiloxane having a specific molecular weight distribution into lubricating oil to obtain defoaming effect on foam generated due to high-speed stirring.

CITATION LIST

Patent Literature

Patent Literature 1: JP 2000-87065 A
Patent Literature 2: JP 2009-235252 A
Patent Literature 3: JP 2008-120889 A

SUMMARY

Technical Problem

Disadvantageously, large specific gravity of polysiloxane defoaming agents (silicone defoaming agents) makes it easy to cause precipitation and unevenness in concentration during long-term storage in bottles or long-term use in machinery, which leads to gradual loss of defoaming effect in course of time, which results in increased foaming of lubricating oil.

For example, torque converters included in automatic transmissions, pulleys included in metal belt-type continuously variable transmissions, etc. have positions where very large centrifugal effect occurs. When lubricating oil is supplied to such centrifugal effect, and concentrates in a specific position of the machinery, which leads to decreased concentration of the defoaming agent in the lubricating oil circulating in the machinery, and thus to increased foaming of the lubricating oil.

An object of the present invention is to provide a defoaming agent which can suppress deterioration of defoaming performance even during long-term storage, and can maintain defoaming performance of lubricating oil for a long term even under such lubricating conditions that the lubricating oil is subjected to high centrifugal effect. The present invention also provides a lubricating oil composition comprising the defoaming agent.

Solution to Problem

A first aspect of the present invention is a defoaming agent comprising a polymer, the polymer comprising: a repeating unit represented by the following general formula (1); and a repeating unit represented by the following general formula (3):

wherein in the general formula (1), $X^1$ is a repeating unit obtainable by polymerization of a first ethylenic unsaturated group; $Y^1$ is a side chain comprising a linear or branched polysiloxane structure, the polysiloxane structure comprising a repeating unit represented by the following general formula (2), and having a polymerization degree of 5 to 300; and $Z^1$ is a linking group linking the repeating unit $X^1$ and the side chain $Y^1$;

wherein in the general formula (2), $R^1$ and $R^2$ are each independently one or a combination of two or more selected from organic groups having 1 to 18 carbons; and

wherein in the general formula (3), $X^2$ is a repeating unit obtainable by polymerization of a second ethylenic unsaturated group; $Y^2$ is a $C_{1\text{-}30}$ hydrocarbyl side chain; and $Z^2$ is a linking group linking the repeating unit $X^2$ and the side chain $Y^2$.

In the first aspect of the present invention, the polymer may further comprise a repeating unit represented by the following general formula (4):

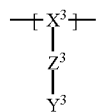
(4)

wherein in the general formula (4), $X^3$ is a repeating unit obtainable by polymerization of a third ethylenic unsaturated group; $Y^3$ is a side chain comprising 3 or more fluorine atoms; and $Z^3$ is a linking group linking the repeating unit $X^3$ and the side chain $Y^3$.

In the first aspect of the present invention, preferably, $X^2$ is a repeating unit obtainable by polymerization of a second (meth)acryloyl group; and $X^1$ is a repeating unit obtainable by polymerization of a first (meth)acryloyl group.

In the first aspect of the present invention, when the polymer comprises the repeating unit represented by the above described general formula (4), $X^3$ is preferably a repeating unit obtainable by polymerization of a third (meth)acryloyl group.

In the first aspect of the present invention, preferably, the polymer comprises the repeating unit represented by the general formula (1) in an amount of no less than 10 mass % on the basis of the total mass of all repeating units in the polymer.

In the first aspect of the present invention, the polymer preferably has a weight average molecular weight of 10,000 to 1,000,000.

A second aspect of the present invention is a lubricating oil composition comprising (A) a lubricant base oil; and (B) the defoaming agent according to the first aspect of the present invention, in an amount of 1 to 100 mass ppm in terms of silicon on the basis of the total mass of the composition.

The lubricating oil composition according the second aspect of the present invention can be preferably used as a lubricating oil for an automobile engine, and automobile transmission, or an automobile transaxle unit.

Advantageous Effects of Invention

The defoaming agent and lubricating oil composition of the present invention can suppress deterioration of defoaming performance even during long-term storage, and can maintain defoaming performance of lubricating oil for a long term even under such lubricating conditions that the lubricating oil is subjected to high centrifugal effect.

BRIEF DESCRIPTION OF DRAWINGS

FIG. 1 is an explanatory view of the structure of a homogenizer test machine that is used for the evaluation of defoaming performance.

DETAILED DESCRIPTION OF EMBODIMENTS

The present invention will be described hereinafter. Expression "A to B" concerning numeral ranges means "no less than A and no more than B" unless otherwise specified. In such expression, if a unit is added only to the numeral value B, the same unit is applied to the numeral value A.

<1. Defoaming Agent>

The defoaming agent according to the first aspect of the present invention comprises a polymer comprising a repeating unit represented by the following general formula (1); and a repeating unit represented by the following general formula (3):

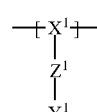
(1)

wherein in the general formula (1), $X^1$ is a repeating unit obtainable by polymerization of a first ethylenic unsaturated group; $Y^1$ is a side chain comprising a linear or branched polysiloxane structure, the polysiloxane structure comprising a repeating unit represented by the following general formula (2), and having a polymerization degree of 5 to 300; and $Z^1$ is linking group linking the repeating unit $X^1$ and the side chain $Y^1$;

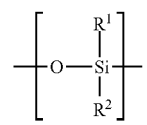
(2)

wherein in the general formula (2), $R^1$ and $R^2$ are each independently one or a combination of two or more selected from organic groups having 1 to 18 carbons.

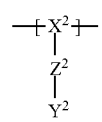
(3)

wherein in the general formula (3), $X^2$ is a repeating unit obtainable by polymerization of a second ethylenic unsaturated group; $Y^2$ is a $C_{1-30}$ hydrocarbyl side chain; and $Z^2$ is a linking group linking the repeating unit $X^2$ and the side $Y^2$.

In the general formula (1), $X^1$ is a repeating unit obtainable by polymerization of an ethylenic unsaturated group, and composes a main chain; $Y^1$ is a side chain comprising a linear or branched polysiloxane structure having a polymerization degree of 5 to 300; and $Z^1$ is a linking group linking the repeating unit $X^1$ and the side chain $Y^1$.

In the polymer, $X^1$ may be a combination of two or more repeating units, $Y^1$ may be a combination of two or more side chains, and $Z^1$ may be a combination of two or more linking groups.

$Y^1$ is a side chain comprising a linear or branched polysiloxane structure that comprises a repeating unit represented by the following general formula (2) and has a polymerization degree of 5 to 300. The polymerization degree of the polysiloxane structure is preferably no less than 10, and more preferably no less than 30; and preferably no more than 250, and more preferably no more than 200. The polymerization degree of less than 5 leads to deteriorated shear stability or defoaming performance of the defoaming agent. The polymerization degree of more than 300 leads to significant increase of viscosity of the defoaming agent, and thus leads to deteriorated defoaming performance thereof.

The polysiloxane structure of $Y^1$ may be linear or branched. Here, the linear polysiloxane structure means the structure represented by the following general formula (5):

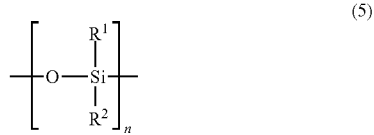

(5)

In the general formula (5), $R^1$ and $R^2$ are as defined above, and n represents the polymerization degree.

The branched polysiloxane structure is obtainable by replacing $R^1$ and/or $R^2$ on the Si atom in one or more repeating units represented by the general formula (5) with a polysiloxane side chain comprising the repeating unit represented by the general formula (2). In the branched polysiloxane structure, the polysiloxane side chain may further comprise one or more branches. The polymerization degree of the polysiloxane structure equals to the total number of Si atoms thereof.

In the general formulae (2) and (5), example of organic groups having 1 to 18 carbons include: substituted or unsubstituted alkyl groups, substituted or unsubstituted phenyl groups, fluoroalkyl groups, and polyether groups. Examples of substituents in substituted alkyl groups and substituted phenyl groups include: hydroxy group, amino groups, ether bond, and ester bond. The carbon numbers of $R^1$ and $R^2$ are 1 to 18, 1 to 12 in one embodiment, and 1 to 6 in another embodiment. Preferred examples of the organic groups include: methyl group, phenyl group, and fluoroalkyl groups. Among them, methyl group can be especially preferably employed.

A chain end of the polysiloxane structure of $Y^1$ which is not bonded with the linking group $Z^1$ may be bonded with, for example, the same group as $R^1$ or $R^2$ in the formulae (2) and (5), and $C_{1-12}$ hydrocarbyl group, a $C_{1-12}$ monovalent organic group having one or more functional groups (such as hydroxy group, amino groups, ether bond, ester bond, and amide bond), or a hydroxy group.

The linking group $Z^1$ is not limited as long as being able to link the repeating unit (main chain skeleton) $X^1$ and the side chain $Y^1$. Preferable examples of $Z^1$ include linking groups having an ester bond, an amide bond, an ether bond, a thioether bond, a thioester bond, a thionoester bond, a thioamide bond, or an imide bond. The linking group $Z^1$ may comprise one or more groups selected from linear or branched alkyl or alkylene groups, alicyclic groups, and aromatic groups, in addition to the above listed chemical bonds. The carbon number of the linking group $Z^1$ is not limited, but is no less than 0, preferably no more than 12, and more preferably no more than 6.

In the general formula (3), the groups same as those described above concerning $X^1$ can be employed as $X^2$. Preferred embodiments of $X^2$ are also same as those described above concerning $X^1$. The groups same as those described above concerning $Z^1$ can be employed as $Z^2$. Preferred embodiments of $Z^2$ are also same as those described above concerning $Z^1$. In the polymer, $X^2$ may be a combination of two or more repeating units, $Y^2$ may be a combination of two or more side chains, and $Z^2$ may be combination of two or more linking groups.

$Y^2$ is a $C_{1-30}$ hydrocarbyl side chain. Specific example of $C_{1-30}$ hydrocarbyl side chains include: alkyl groups (that may have a ring structure), alkenyl groups (that may have a double bond in any position, and may have a ring structure), aryl groups (that may have a alkyl or alkenyl group), arylalkyl groups, and arylalkenyl groups.

Examples of alkyl groups include various linear or branched alkyl groups. Examples of a ring structure that an alkyl group may have include: cycloalkyl groups having 5 to 7 carbon atoms such as cyclopentyl group, cyclohexyl group, and cycloheptyl group. A chain hydrocarbyl substituent, if any, may be in any position on the ring structure.

Examples of alkenyl groups include various linear or branched alkenyl groups. Examples of a ring structure that an alkenyl group may have include the above described cycloalkyl group, and cycloalkenyl group having 5 to 7 carbon atoms such as cyclopentyl group, cyclohexenyl group and cycloheptenyl group. A chain hydrocarbyl substituent, if any, may be in any position on the ring structure.

Examples of aryl groups include phenyl group and naphthyl group. In alkylaryl groups, alkenylaryl groups, arylalkyl groups, and arylalkenyl groups, a substituent may be in any position on an aromatic ring.

The carbon number of $Y^2$ is 1 to 30, preferably no less than 8, and more preferably no less than 12; and preferably no more than 22, and more preferably no more than 18. $Y^2$ is preferably an aliphatic hydrocarbyl group, more preferably a chain aliphatic hydrocarbyl group, and especially preferably an alkyl group.

In one embodiment, the defoaming agent of the present invention can be obtained by copolymerization of a (meth) acrylic acid derivative. In such an embodiment, $X^1$ and $X^2$ are repeating units obtainable by polyermization of a (meth) acryloyl group. In the present description, "(meth)acryl" means acryl and/or methacryl, and "(meth)acryloyl)" means acryloyl and/or methacryloyl. The repeating units $X^1$ and $X^2$ obtainable by polymerization of a (meth)acryloyl group are represented by the following general formula (6):

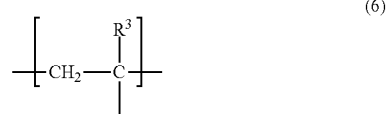

(6)

In the formula (6), $R^3$ represents a hydrogen atom or a methyl group; and a carbonyl group is bonded to one of the remaining atom valences of the carbon atom to which $R^3$ is bonded. A plurality of $R^3$ may be all the same, or may be different from each other.

In such an embodiment, the repeating unit represented by the general formula (1) is preferably represented by the following general formula (7), and the repeating unit represented by the general formula (3) is preferably represented by the following general formula (8):

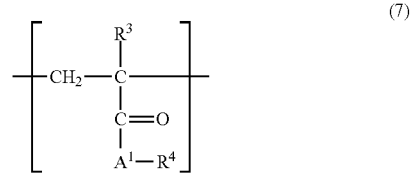

(7)

In the formula (7), $R^3$ is a hydrogen atom or a methyl group; $R^4$ is an organic group comprising a linear or branched polysiloxane structure, the polysiloxane structure comprising a repeating unit represented by the general formula (2) and having a polymerization degree of 5 to 300; and $A^1$ is an —O—0 group, a —NH— group, or a —S— group.

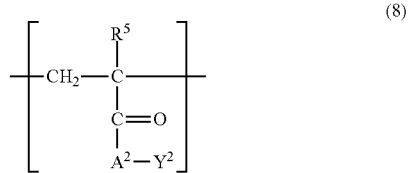

(8)

In the formula (8), $R^5$ is a hydrogen atom or a methyl group; $Y^2$ is as described above; and $A^2$ is an —O— group, a —NH— group, or a —S— group.

The polymer is a copolymer comprising the repeating unit represented by the general formula (1), and the repeating unit represented by the general formula (3). The polymer may be a random copolymer, or may be a block copolymer. In view of improving defoaming performance, the proportion of the repeating units represented by the general formula (1) in the polymer is preferably no less than 10 mass %, more preferably no less than 50 mass %, further preferably no less than 65 mass %, and especially preferably no less than 70 mass %; and less than 100 mass %, and preferably no more than 98 mass %, on the basis of the total mass of all repeating units (100 mass %) in the polymer.

The proportion of the repeating units represented by the general formula (3) in the polymer is normally no less than 1 mass %, and preferably no less than 2 mass %; and normally no more than 30 mass %, and preferably no more than 10 mass %, on the basis of the total mass of all repeating units (100 mass %) in the polymer.

In one embodiment, the polymer may further comprise a repeating unit represented by the following general formula (4):

(4)

In the formula (4), $X^3$ is a repeating unit obtainable by polymerization of an ethylenic unsaturated group; $Y^3$ is a side chain comprising no less than 3 fluorine atoms; and $Z^3$ is a linking group linking the repeating unit $X^3$ and the side chain $Y^3$.

In the formula (4), the groups same as those described above concerning $X^1$ can be employed as $X^3$. Preferred embodiments of $X^3$ are also same as those described above concerning $X^1$. The groups same as those described above concerning $Z^1$ can be employed as $Z^3$. Preferred embodiments of $Z^3$ are also same as those described above concerning $Z^1$. In the polymer, $X^3$ may be a combination of two or more repeating units, $Y^3$ may be a combination of two or more side chains, and $Z^3$ may be a combination of two or more linking groups.

$Y^3$ is a side chain comprising no less than 3 flourine atoms. An organic group comprising no less than 3 fluorine atoms can be employed as $Y^3$ without any specific limitation. A fluoroalkyl group or a fluoroalkyl (poly)ether group can be preferably employed.

The number of fluorine atoms n the side chain $Y^3$ is no less than 3, preferably no less than 5, and more preferably no more than 17. The number of fluorine atoms in the side chain $Y^3$ of this lower limit or over leads to improved defoaming performance. The number of fluorine atoms in the side chain $Y^3$ over this upper limit makes it easy for the obtained polymer to solidify, and thus leads to deteriorated defoaming performance, which is thus unfavorable.

Examples of fluoroalkyl groups include a $C_{1-4}$ perfluoroalkyl groups; the groups represented by the following general formula (9); the groups represented by the following general formula (10); 1,1,1,3,3,3-hexafluoro-2-propyl group; 2,2-bis(trifluoromethyl)propyl group; perfluorocyclohexylmethyl group; pentafluorobenzyl group; 2,3,5,6-tetrafluorophenyl group; 2,2,2-trifluoro-1-phenyl-1-(trifluoromethyl)ethyl group; and 3-(trifluoromethyl)benzyl group.

(9)

In the formula (9), E is a fluorine atom or hydrogen atom; p is an integer of 1 to 6; q is an integer of 1 to 15; and when q is 1, E is a fluorine atom.

In the general formula (9), q is preferably no less than 2, and preferably no more than 8. q of this lower limit of over leads to improved defoaming performance. q over this upper limit makes it easy for the obtained polymer to solidify, and thus leads to deteriorated defoaming performance, which is thus unfavorable.

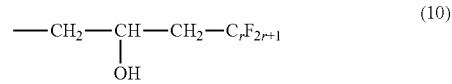

(10)

In the formula (10), r is an integer of 2 to 9.

In the general formula (10), r is preferably no less than 4, and preferably no more than 8. r of this lower limit or over leads to improved defoaming performance. r over this upper limit makes it easy for the obtained polymer to solidify, and thus leads to deteriorated defoaming performance, which is thus unfavorable.

Examples of the $C_{1-4}$ perfluoroalkyl group include: trifluoromethyl group, perfluoroethyl group, perfluoropropyl group, perfluoroisopropyl group, and perfluoro-tert-butyl group.

Examples of the group represented by the general formula (9) include: 2,2,2-trifluoroethyl group; 1H,1H,3H-hexafluorobutyl group; 2-(perfluorobutyl)ethyl group; 3-(perfluorobutyl)propyl group; 6-(perfluorobutyl)hexyl group; 2-(perfluoro-5-methylhexyl)ethyl group; 2-(perfluoro-7-methyloctyl)ethyl group; 4,4,5,5,5-pentafluoropentyl group; 2-(perfluorohexyl)ethyl group; 2-(perfluorooctyl)ethyl group; 3-(perfluorohexyl)propyl group; 3-(perfluorooctyl)propyl group; 1H,1H,3H-tetrafluoropropyl group; 1H,1H,5H-octafluoropentyl group; 1H,1H,7H-dodecafluoroheptyl group; 1H,1H,9H-hexadecafluorononyl group; 6-(perfluoro-1-methylhexyl)hexyl group; 1H,1H-(3,5,5-tris(trifluoromethyl))octafluorohexyl group; 1H,1H,11H-eicosafluoroundecyl group; 2-(perfluoro-3-methylbutyl)ethyl group; 1H,1H-perfluoropropyl group; 1H/1H-perfluorobutyl group;

1H/1H-perfluoropentyl group; 1H,1H-perfluorohexyl group; 1H,1H-perfluoroheptyl group; 1H/1H-perfluorooctyl group; 1H,1H-perfluorononyl group; 1H,1H-perfluorodecyl group; 1H,1H-perfluoroundecyl group; 1H,1H-perfluorododecyl group; 1H,1H-perfluorotetradecyl group; 1H,1H-perfluorohexadecyl group; 1H,1H-perfluoro-3,7-dimethyloctyl group; 2-(perfluorodecyl)ethyl group; 2-(perfluorododecyl)ethyl group; and 2-(perfluoro-9-methyldecyl)ethyl group.

Examples of the group represented by the general formula (10) include: 3-(perfluorobutyl)-2-hydroxypropyl group; 3-(perfluoro-3-methylbutyl)-2-hydroxypropyl group; 3-(perflurooctyl)-2-hydroxypropyl group; 3-(perfluoro-5-methylhexyl)-2-hydroxypropyl group; and 3-(perfluoro-7-methyloctyl)-2-hydroxypropyl group.

Examples of fluoroalkyl (poly)ether groups include: the groups represented by the following general formula (11); 2-[(perfluoropropanoyl)oxy]ethyl group; and fluoropolyether groups comprising a perfluoropolyethylene oxide group; and perfluoropolypropylene oxide group, or a perfluoropolyoxetane group, and fluoropolyether copolymer groups thereof.

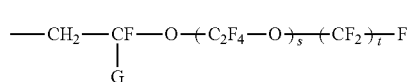

(11)

In the formula (11), G is a fluorine atom or a trifluoromethyl group; s is an integer of 0 to 2; and t is an integer of 1 to 4.

Examples of the group represented by the general formula (11) include: 1H,1H-perfluoro-3,6-dioxadecyl group; 1H,1H-perfluoro-3,6,9-trioxadecyl group; 1H,1H-perfluoro-3,6,9-trioxatridecyl group; 2-perfluoropropoxy-2,3,3,3-tetrafluoropropyl group; and 1H,1H-perfluoro-2,5-dimethyl-3,6-dioxanonyl group.

Among the above description, the group represented by the general formula (9) can be especially preferably employed as the side chain $Y^3$.

In one embodiment, $X^3$ is a repeating unit obtainable by polymerization of a (meth)acryloyl group. The repeating unit $X^3$ obtainable by polymerization of a (meth)acryloyl group is represented by the general formula (6). In such an embodiment, the repeating unit represented by the general formula (4) is preferably represented by the following general formula (12):

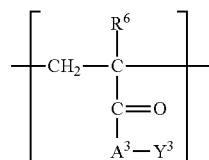

(12)

In the formula (12), $R^6$ is a hydrogen atom or a methyl group; $Y^3$ is a described above; and $A^3$ is an —O— group, a —NH— group, or a —S— group.

In view of improving defoaming performance, the proportion of the repeating units represented by the general formula (4) in the polymer is preferably no more than 50 mass %, more preferably no more than 35 mass %, and further preferably no more than 30 mass %, on the basis of the total mass of all repeating units (100 mass %) in the polymer. The lower limit is not restricted, and may be 0 mass %. In one embodiment, the lower limit may be no less than 2 mass %. In another embodiment, the lower limit may be no less than 5 mass %.

Monomers other than the monomer giving the repeating unit of the general formula (1), (3), or (4) include: a carboxylic acid ester having an ethylenic unsaturated group, the carboxylic acid having a $C_{1-30}$ linear or branched alkyl group as an alcohol residue (such as fumaric acid diesters, phthalic acid monoesters, phthalic acid diesters, itaconic acid monoesters, and itaconic acid diesters), phthalic anhydride, itaconic anhydride, (meth)acrylonitrile, acrylamide, styrene, vinylpyridine, and vinyl esters of $C_{1-20}$ linear or branched chain aliphatic carboxylic acids.

In the defoaming agent of the present invention, the polymer preferably has a weight average molecular weight of 10,000 to 1,000,000, more preferably 50,000 to 450,000, further preferably 100,000 to 450,000, and especially preferably 150,000 to 250,000. Here, a weight average molecular weight means a weight average molecular weight in terms of polystyrene which is measured by gel permeation chromatography (GPC) using polystyrene as a standard substance. The weight average molecular weight of less than 10,000 leads to high solubility of the defoaming agent in base oil, and thus to deteriorated defoaming performance, which is thus not preferable. The weight average molecular weight of more than 1,000,000 leads to significant increase of viscosity of the defoaming agent, and thus deteriorate defoaming performance, which is thus not preferable.

A way of producing the defoaming agent of the present invention is not restricted, but any way can be suitably employed. For example, one may polymerize a raw material comprising a macromonomer giving the repeating unit represented by the general formula (1) upon polymerization, and a monomer giving the repeating unit represented by the general formula (3) upon polymerization, or one may first build a main chain skeleton by polymerization reaction, and thereafter introduce the side chain $Y^1$ via the linking group $Z^1$ by reacting the resultant reaction product with a compound having a polysiloxane structure of a desired polymerization degree. In the polymerization reaction, known way such as mass polymerization and solution polymerization can be used without any limitation. Among the, mass polymerization can be preferably employed.

<2. Lubricating Oil Composition>

The lubricating oil composition according to the second aspect of the present invention comprises: (A) a lubricant base oil; and (B) the defoaming agent according to the first aspect of the present invention (hereinafter may be referred to as "comb-shaped polymer defoaming agent") in an amount of 1 to 100 mass ppm in terms of silicon on the basis of the total mass of the composition.

((A) Lubricant Base Oil)

A lubricant base oil in the lubricating oil composition of the present invention is not restricted, but a mineral base oil or synthetic base oil used for general lubricating oil can be used.

Specific examples of mineral base oils include: oils obtained by refining lubricant oil fractions that are obtained by vacuum distillation of atmospheric residue obtained by atmospheric distillation of crude oil, through at least one of processes such as solvent deasphalting, solvent extraction, hydrocracking, solvent dewaxing, and hydrorefining; wax isomerized mineral oils; and lubricant base oils produced by a process of isomerizing GTL WAX (gas to liquid wax) that is produced by a Fischer-Tropsch process, and the like.

Examples of synthetic base oils include: poly-α-olefins such as 1-octene oligomer and 1-decene oligomer, or hydrogenated products thereof; isobutene oligomer or hydrogenated product thereof; paraffin; alkylbenzene; alkylnaphthalene; diesters (such as ditridecyl glutarate; (bis(2-ethylhexyl) azipate, diisodecyl azipate, ditridecyl azipate, and bis(2-ethylhexyl) sebacate); polyol esters (such as trimethylolpropane caprilate, trimethylolpropane pelargonate, pentaerythritol 2-ethylhexanoate, and pentaerythritol pelargonate); polyoxyalkylene glycol; dialkyl diphenyl ether; and polyphenyl ether. Examples other than them include: aromatic synthetic oils such as alkylnaphthalene, alkylbenzene, or mixtures thereof.

In the lubricating oil composition of the present invention, mineral base oils, synthetic base oils, any mixture of two or more lubricating oils selected therefrom, or the like can be used as the lubricant base oil. Examples thereof include at least one mineral base oil, at least one synthetic base oil, and a mixed oil of at least one mineral base oil and at least one synthetic base oil.

The kinematic viscosity of the base oil at 100° C. is preferably 1.0 to 50 mm$^2$/s. Too high kinematic viscosity of the base oil tends to lead to deteriorated low-temperature viscosity. In contrast, too low kinematic viscosity of the base oil leads to deteriorated anti-wear performance on sliding parts of various kinds of machinery. In view of preventing viscosity decrease of the obtained lubricating oil composition, the kinematic viscosity of the base oil at 100° C. is preferably 2.0 to 15 mm$^2$/s, and especially preferably of 3 to 10 mm$^2$/s.

The pour point of the base oil is not restricted, but preferably is no more than −10° C., and especially preferably no more than −15° C.

The viscosity index of the base oil is preferably no less than 105 in view of preventing viscosity decrease at high temperature.

(B)) Comb-Shaped Polymer Defoaming Agent)

The defoaming agent (comb-shaped polymer defoaming agent) according to the first aspect of the present invention has already been described in detail. The content of the comb-shaped polymer defoaming agent in the lubricating oil composition of the present invention is 1 to 100 mass ppm in terms of silicon on the basis of the total mass of the composition. No effect is expectable as the defoaming agent if the content is less than 1 mass ppm in terms of Si. The content of more than 100 mass ppm in terms of Si leads to precipitation of the defoaming agent etc., and thus to deteriorated lifetime of the defoaming agent, which is thus unfavorable. The content of the comb-shaped polymer defoaming agent in the lubricating oil composition of the present invention is preferably no less than 5 mass ppm, and preferably no more than 50 mass ppm in terms of silicon on the basis of the total mass of the composition.

(Other Additives)

The lubricating oil composition according to the second aspect of the present invention may further contain at least one additive selected from (C) ashless dispersants, (D) antioxidants, (E) friction modifiers, (F) anti-wear agents or extreme-pressure agents, (G) metallic detergents, (H) viscosity index improvers or pour point depressants, (I) corrosion inhibitors, (J) anti-rust agents, (K) metal deactivators, (L) demulsifiers, (M) defoaming agents other than the polymer comprising the repeating unit of the general formula (1), and (N) coloring agents, in addition to the above described (A) lubricant base oil and (B) comb-shaped polymer defoaming agent. One may have an additive package by adding one or more additives selected from the (C) to (N) to the defoaming agent according to the first aspect of the present invention.

For example, known ashless dispersants such as succinimide ashless dispersants can be used as (C) ashless dispersants. Examples thereof include: polybutenylsuccinimides having a polybutentyl group, the polybutenyl group having a number average molecular weight of 900 to 3500; polybutenylbenzylamines; polybutenylamines; and derivatives thereof (such as boric acid-modified products).

When the lubricating oil composition of the present invention contains ashless dispersants, the content thereof is normally no less than 0.01 mass %, and preferably no less than 0.1 mass %; and normally no more than 20 mass %, and preferably no more than 10 mass %, on the basis of the total mass of the lubricating oil composition, that is, to the total mass of the lubricating oil composition as 100 mass %.

Known antioxidants such as phenol antioxidants and amine antioxidants can be used as (D) antioxidants. Example thereof include amine antioxidants such as alkylated diphenylamines, phenyl-α-naphtylamine, alkylated α-naphthylamines, and phenol antioxidants such as 2,6-di-tert-butyl-4-methylphenol, 4,4'-methlenebis(2,6-di-tert-butylphenol).

When the lubricating oil composition of the present invention contains antioxidants, the content thereof is normally no more than 5.0 mass %, and preferably no more than 3.0 mass %; and preferably no less than 0.1 mass %, and more preferably no less than 0.5 mass %, on the basis of the total mass of the lubricating oil composition.

Known friction modifiers can be used as (E) friction modifiers. Examples thereof include: aliphatic acid esters; aliphatic acid amides; phosphorus compounds such as phosphate esters, phosphite esters, and thiophosphate esters; organic molybdenum compounds such as MoDTP and MoDTC; organic zinc compounds such ZnDTP; organic boron compounds such as alkylmercaptyl borates; graphite; molybdenum disulfide; antimony sulfide; boron compounds; and polytetrafluoroethylene.

When the lubricating oil composition of the present invention contains friction modifiers, the content thereof is normally 0.05 to 5 mass % on the basis of the total mass of the lubricating oil composition.

Known anti-wear agents or extreme-pressure agents can be used as (F) anti-wear agents or extreme-pressure agents. Examples thereof include: metal dithiophosphates (such as Zn salt, Pb salt, Sb salt, and Mo salt), metal dithiocarbamates (such as Zn salt, Pb salt, Sb salt, and Mo salt), naphthenic acid metal salts (such as Pb salt), fatty acid metal salts (such as Pb salt), boron compounds, phosphate esters, phosphite esters, alkyl hydrogenphosphites, phosphate ester amine salts, phosphate ester metal salts (such as Zn salt), disulfides, sulfurized fat, sulfurized olefins, dialkyl polysulfides, diarylalkyl polysulfides, and diaryl polysulfides.

When the lubricating oil composition of the present invention contains anti-wear agents or extreme-pressure agents, the content thereof is normally 0.05 to 5 mass % on the basis of the total mass of the lubricating oil composition.

Known metallic detergents can be used as (G) metallic detergents. Examples thereof include alkali metal and alkaline earth metal sulfonates, alkali metal and alkaline earth metal phenates, alkali metal and alkaline earth metal salicylates, and combinations thereof. These metallic detergents may be overbased. Here, "alkaline earth metal" encompasses Mg.

When the lubricating oil composition of the present invention contains metallic detergents, the content thereof is not restricted. When the composition is for automobile transmissions, the content thereof is normally 0.005 to 1.0 mass % in terms of metal elements on the basis of the total mass of the lubricating oil composition. When the composition is for internal combustion engines, the content thereof is normally 0.01 to 5.0 mass % in terms of metal elements on the basis of the total mass of the lubricating oil composition. When the composition is for automobile transaxle units, the content thereof is normally 0.001 to 0.01 mass % in terms of metal elements on the basis of the total mass of the lubricating oil composition.

Known viscosity index improvers or pour point depressants can be used as (H) viscosity index improvers or pour point depressants. Examples of viscosity index improvers include so-called non-dispersant viscosity index improvers such as polymers and copolymers of one or at least two monomers selected from various methacrylates, and hydrogen adducts thereof; so-called dispersant viscosity index improvers that are copolymers of various methacrylates containing nitrogen compounds; non-dispersant or dispersant ethylene-α-olefin copolymers and hydrogen adducts thereof; polyisobutyrene and hydrogen adducts thereof; hydrogen adducts of styrene-diene copolymers; styrene-maleic anhydride copolymer; and polyalkylstyrenes. When the lubricating oil composition of the present invention contains viscosity index improvers, the content thereof is normally 0.1 to 20 mass % on the basis of the total mass of the lubricating oil composition.

Examples of pour point depressants include polymethacrylate polymers. When the lubricating oil composition of the present invention contains pour point depressants, the content thereof is normally 0.01 to 1 mass % on the basis of the total mass of the lubricating oil composition.

For example, known corrosion inhibitors such as benzotriazole compounds, tolyltriazole compounds, thiadiazole compounds, and imidazole compounds can be used as (I) corrosion inhibitors. When the lubricating oil composition of the present invention contains corrosion inhibitors, the content thereof is normally 0.005 to 5 mass % on the basis of the total mass of the lubricating oil composition.

For example, known anti-rust agents such as petroleum sulfonates, alkylbenzenesulfonates, dinonylnaphthalenesulfonates, alkylsulfonate salts, fatty acids, alkenylsuccinic acid half esters, fatty acid soaps, polyol esters of fatty acids, fatty amines, oxidized paraffins, and alkyl polyoxyethylene ethers can be used as (J) anti-rust agents. When the lubricating oil composition of the present invention contains anti-rust agents, the content thereof is normally 0.005 to 5 mass % on the basis of the total mass of the lubricating oil composition.

For example, known metal deactivators such as imidazoline, pyrimidine derivatives, alkylthiadiazoles, mercaptobenzothiazole, benzotriazole and derivatives thereof, 1,3,4-thiadiazole polysulfides, 1,3,4-thiadiazolyl-2,5-bisdialkyldithiocarbamates, 2-(alkyldithio)benzimidazoles, and β-(o-carboxybenzylthio)propionitrile can be used as (K) metal deactivators. When the lubricating oil composition of the present invention contains these metal deactivators, the content thereof is normally 0.005 to 1 mass % on the basis of the total mass of the lubricating oil composition.

For example, known demulsifiers such as polyalkylene glycol-based nonionic surfactants can be used as (L) demulsifiers. When the lubricating oil composition of the present invention contains demulsifiers, the content thereof is normally 0.005 to 5 mass % on the basis of the total mass of lubricating oil composition.

For example, known defoaming agents such as silicones, fluorosilicones, and fluoroalkyl ethers can be used as (M) defoaming agents other than the polymer comprising the repeating unit of the general formula (1). When the lubricating oil composition of the present invention contains these defoaming agents, the content thereof is normally 0.0001 to 0.1 mass % on the basis of the total mass of the lubricating oil composition.

For example, known coloring agents such as azo compounds can be used as (N) coloring agents.

(Lubricating Oil Composition)

The viscosity of the lubricating oil composition of the present invention is not restricted. Generally, the comb-shaped polymer defoaming agent of the present invention can be preferably used in the lubricating oil composition whose kinematic viscosity at 100° C. is no less than 2 mm$^2$/s and no more than 20 mm$^2$/s, and is especially effective in the lubricating oil composition whose kinematic viscosity at 100° C. is no less than 2 mm$^2$/s and no more than 10 mm$^2$/s, which is of relatively low viscosity.

The lubricating oil composition of the present invention, owing to improved storage stability of the defoaming agent, can suppress separation and precipitation of the defoaming agent even during long-term storage, and thereby suppress deterioration of defoaming performance. The lubricating oil composition of the present invention can maintain good defoaming performance for a long term even under such lubricating conditions that a lubricating oil is subjected to high centrifugal effect. As a result, foaming of the lubricating oil can be suppressed for a long term, which makes it also possible to suppress promoted deterioration of the lubricating oil, failure to control hydraulic pressure, wear and seizure, etc. due to foaming, for a long term.

(Use)

The lubricating oil composition of the present invention can be widely used for the purpose of lubrication that demands defoaming performance especially in view of the above described functions and effect. For example, the lubricating oil composition of the present invention can be preferably used as internal combustion engine oil, hydraulic oil, industrial gear oil, turbine oil, compressor oil, transmission oil, and automobile axle unit oil, and among them, especially preferably used as automobile engine oil, automobile transmission oil, or automobile axle unit oil.

(Production)

A method for producing the lubricating oil composition of the present invention is not restricted. It can be produced by known methods, for example, preparing a dilution by dissolving the defoaming agent in a hydrocarbon solvent which can dissolve a base oil and the defoaming agent, or by finely dispersing the defoaming agent in a small amount of a base oil by vigorous stirring, and thereafter adding the dilution to a lubricating oil comprising a base oil, or comprising a base oil and at least one additive other than the defoaming agent.

The concentration of the defoaming agent in the dilution is preferably no less than 500 mass ppm, more preferably no less than 1,000 mass ppm, and further preferably no less than 3,000 mass ppm; and preferably no more than 50,000 mass ppm, and more preferably no more than 40,000 mass ppm in terms of silicon on the basis of the total mass of the dilution. The concentration of the defoaming agent in the dilution of this lower limit or over makes it possible to suppress a flash point of the lubricating oil from decreasing due to the dilution. The concentration of the defoaming agent in the dilution of this upper limit or below makes it easy to suppress deterioration of lifetime of the defoaming agent due to precipitation of the defoaming agent.

The amount of the dilution to be added to the lubricating oil can be such an amount that the above described preferred content of the defoaming agent in the lubricating oil composition of the present invention is realized.

The lubricating oil before addition of the dilution may already contain additives other than the defoaming agent, in addition to a base oil. One may also add the dilution to a lubricating oil consisting of a base oil and not comprising additives other than the defoaming agent, and thereafter add other additives.

When adding the dilution in which the defoaming agent is dissolved or finely dispersed to the lubricating oil, one may add the dilution to the lubricating oil little by little successively (for example, dropwise) while mixing, or one may add a desired amount of the dilution to the lubricating oil in one portion. In view of more finely dispersing the defoaming agent in the lubricating oil composition, it is preferably to successively add the dilution to the lubricating oil while mixing.

EXAMPLES

Hereinafter the present invention will be more specifically described based on the examples and comparative examples. The following examples are intended to show examples of the present invention, but not intended to limit the present invention.

Preparation Examples (Measurement of Molecular Weight and Molecular Weight Distribution)

In the following preparation examples and examples, molecular weights and molecular weight distributions were measured using a GPC system (HLC-8220 manufactured by Tosoh Corporation) equipped with three columns (TSKgel SuperMultiporeHZ-M; 4.6 mm in internal diameter×15 cm, manufactured by Tosoh Corporation) were connected in series and a differential refractometer (RI) detector, using tetrahydrofuran as a mobile phase, and polystyrene as a standard material, under conditions of measurement temperature: 40° C., flow rate: 0.35 mL/min, sample concentration: 1 mass %, and sample injection volume: 5 μL.

(Measurement of Average Particle Size of Defoaming Agent)

In the following preparation examples, the average particle size of each defoaming agent was obtained by the following procedure: first, 1 g of a reaction mixture containing the defoaming agent after polymerization reaction was added to 10 mL of n-decane, and was sufficiently stirred, to prepare a solution in which the defoaming agent was dissolved. 1 mL of the solution was added to 10 mL of a mineral oil, and was sufficiently stirred to afford a sample in which the defoaming agent was finely dispersed. The average particle size of the sample (25° C.) was calculated by cumulant analysis based on the measurement result of the sample measured by a dynamic light scattering measurement device, Photal ELSZ-0 (manufactured by Otsuka Electronics Co., Ltd.). YUBASE™ 4 manufactured by SK Lubricants Co., Ltd. (kinematic viscosity (100° C.): 4.2 mm$^2$/s, kinematic viscosity (40° C.): 19.4 mm$^2$/s, viscosity index: 125) was used as the mineral oil. The mixture after addition of the solution to the mineral oil was stirred in a 100 mL beaker using a columnar magnetic stir bar made from PTFE (polytetrafluoroethylene) of 8 mm in diameter×30 mm in length, at ambient temperature at 200 rpm for 30 minutes.

Preparation Example 1

A comb-shaped polymer defoaming agent A according to the first aspect of the present invention was prepared by the following procedures:

To a 100 ml four-necked flask equipped with a stirrer wing made from polytetrafluoroethylene (with vacuum sealing), a Dimroth condenser, a three-way valve for nitrogen introduction, and a sample inlet, KF2012 (methacrylate-modified polydimethylsiloxane; manufactured by Shin-Etsu Chemical Co., Ltd.; functional group equivalent 4,600 g/mol) (9.75 parts by mass), octadecyl methacrylate (0.25 parts by mass), and dodecyl mercaptan (0.01 parts by mass) were introduced and stirred to be a uniform mixture, and thereafter the reaction system was vacuum-degassed and purged with nitrogen five times using a diaphragm pump. Under a nitrogen flow, 0.1 parts by mass of PEROCTA O (1,1,3,3-tetramethylbutyl peroxy-2-ethylhexanoate; a peroxide radical polymerization initiator; manufactured by NOF CORPORATION) as a radical polymerization initiator was introduced from the sample inlet, and the resultant mixture was stirred for 8 hours at polymerization temperature of 70° C. under a nitrogen atmosphere to conduct a polymerization reaction, to afford the comb-shaped polymer defoaming agent A. The weight average molecular weight (Mw) of the obtained comb-shaped polymer defoaming agent A was 185,000, and the polydispersity index thereof (Mw/Mn) was 2.1. The average particle size of the defoaming agent particles in a dispersion which was measured by the above described measurement procedure was 0.6 μm.

Preparation Examples 2 to 6

Comb-shaped polymer defoaming agents B to F according to the first aspect of the present invention were prepared in the same way as the preparation example 1 except that the monomer and the polymerization initiator were changed as in the following Table 1.

Preparation Example 7

A defoaming agent G that was outside the scope of the present invention was prepared by the following procedures:

To a 100 ml four-necked flask equipped with a stirrer wing made from polytetrafluoroethylene (with vacuum sealing), a Dimroth condenser, a three-way valve for nitrogen introduction, and a sample inlet, 30 parts by mass of KF2012 (methacrylate-modified polydimethylsiloxane; manufactured by Shin-Etsu Chemical Co., Ltd.; functional group equivalent 4,600 g/mol), and 0.024 parts by mass of dodecyl mercaptan were introduced and stirred to be a uniform mixture, and thereafter the reaction system was vacuum-degassed and purged with nitrogen five times using a diaphragm pump. Under a nitrogen flow, 0.45 parts by mass of MAIB (dimethyl 2,2'-azobisisobutyrate; azo type initiator manufactured by Otsuka Chemical Co., Ltd.) as a radical polymerization initiator was introduced from the sample inlet, and the resultant mixture was stirred for 8 hours at polymerization temperature of 70° C. under a nitrogen atmosphere to conduct a polymerization reaction, to afford the defoaming agent G. As a result of GPC analysis (standard material: polystyrene), the weight average molecular weight (Mw) of the obtained defoaming agent polymer was 125,000, and the polydispersity index thereof (Mw/Mn) was 1.72.

TABLE 1

| | | | Preparation Example | | | | | |
| --- | --- | --- | --- | --- | --- | --- | --- | --- |
| | | | 1 | 2 | 3 | 4 | 5 | 6 |
| | Defoaming agent | | A | B | C | D | E | F |
| Monomer | Macromonomer A (*1) | parts by mass | 9.75 | 9.5 | 9.25 | 9.5 | — | 7.6 |
| | Macromonomer B (*2) | parts by mass | — | — | — | — | 9.5 | — |
| | TDF-OMA (*3) | parts by mass | — | — | — | — | — | 1.9 |
| | C18MA (*4) | parts by mass | 0.25 | 0.5 | 0.75 | 0.5 | 0.5 | 0.5 |
| Polymerization modifier | Dodecyl mercaptan | parts by mass | 0.01 | 0.01 | 0.01 | 0.01 | 0.01 | 0.01 |
| Initiator | POO (*5) | parts by mass | 0.1 | 0.1 | 0.1 | — | 0.1 | 0.1 |
| | MAIB (*6) | parts by mass | — | — | — | 0.1 | — | — |
| Average molecular weight | Mw | | 185,000 | 182,000 | 205,000 | 183,000 | 203,000 | 181,000 |
| | Mw/Mn | | 2.1 | 2.05 | 2.1 | 2.07 | 2.1 | 2.06 |
| Average particle size | | μm | 0.6 | 0.5 | 0.6 | 0.5 | 0.5 | 0.6 |

(*1) macromonomer A: KF2012 by Shin-Etsu Chemical Co., Ltd, single-end methacryl-modified silicone, functional group equivalent = 4,600 g/mol
(*2) macromonomer B: X22-2426 by Shin-Etsu Chemical Co., Ltd, single-end methacryl-modified silicone, functional group equivalent = 12,000 g/mol
(*3) TDF-OMA: 1H,1H,2H,2H-tridecafluoro-n-octyl methacrylate by Tokyo Chemical Industry Co., Ltd.
(*4) C18MA: octadecyl methacrylate
(*5) POO: a peroxide radical initiator by NOF CORPORATION, 1,1,3,3-tetramethylbutyl peroxy-2-ethylhexanoate
(*6) MAIB: azo type radical initiator by Otsuka Chemical Co., Ltd., dimethyl 2,2'-azobisisobutyrate Examples 1 to 8 and Comparative Examples 1 to 5

As shown in Table 2, lubricating oil compositions according to the second aspect of the present invention (Examples 1 to 8), and lubricating oil compositions for comparison (Comparative Examples 1 to 5) were prepared. In Table 2, "Si ppm" means mass ppm in terms of silicon. Defoaming agents were incorporated into lubricating oil compositions by the following procedure: a defoaming agent was added to kerosene and was sufficiently stirred to prepare a dilution (defoaming agent content: 0.3 mass % in terms of silicon on the basis of the total mass of the dilution) comprising the defoaming agent dissolved in kerosene. Thereafter, the dilution was added to a lubricating oil composition dropwise while stirring, to afford a lubricating oil composition having a defoaming agent concentration as in Table 2.

TABLE 2

| | | | Examples | | | | | | | | Comparative Examples | | | | |
| --- | --- | --- | --- | --- | --- | --- | --- | --- | --- | --- | --- | --- | --- | --- | --- |
| | | | 1 | 2 | 3 | 4 | 5 | 6 | 7 | 8 | 1 | 2 | 3 | 4 | 5 |
| Lubricating oil | Transmission oil (*1) | | balance | balance | balance | balance | balance | balance | balance | | balance | balance | balance | balance | |
| | Engine oil (*2) | | | | | | | | | balance | | | | | balance |
| Defoaming agent | Defoaming agent A | Si ppm | 10 | | | | | | 30 | 10 | | | | | |
| | Defoaming agent B | Si ppm | | 10 | | | | | | | | | | | |
| | Defoaming agent C | Si ppm | | | 10 | | | | | | | | | | |
| | Defoaming agent D | Si ppm | | | | 10 | | | | | | | | | |
| | Defoaming agent E | Si ppm | | | | | 10 | | | | | | | | |
| | Defoaming agent F | Si ppm | | | | | | 10 | | | | | | | |
| | Defoaming agent G | Si ppm | | | | | | | | | 10 | | | | |
| | Defoaming agent H (*3) | Si ppm | | | | | | | | | | 10 | | | |
| | Defoaming agent I (*4) | Si ppm | | | | | | | | | | | 10 | 30 | 10 |
| Amount of foaming in homogenizer test | | | | | | | | | | | | | | | |
| | Fresh oil | mL | 50 | 50 | 50 | 50 | 60 | 50 | 50 | 50 | 50 | 70 | 40 | 40 | 40 |
| | Supernatant after 3 h Centrifugation | mL | 60 | 70 | 70 | 70 | 80 | 60 | 60 | 60 | 100 | 100 | 100 | 100 | 100 |
| Silicon content oil | | | | | | | | | | | | | | | |
| | Fresh oil | ppm | 10 | 10 | 10 | 10 | 10 | 10 | 30 | 10 | 10 | 10 | 10 | 30 | 10 |
| | Supernatant after 3 h Centrifugation | ppm | 6 | 5 | 5 | 5 | 4 | 4 | 14 | 6 | <1 | <1 | <1 | <1 | <1 |

(*1) transmission oil obtained by removing defoaming agents from "ENEOS FINE AT FLUID" by JX Nippon Oil & Energy Corporation, kinematic viscosity at 100° C.: 7.3 mm$^2$/s
(*2) engine oil obtained by removing defoaming agents from "ENEOS FINE 5W20" by JX Nippon & Energy Corporation, kinematic viscosity at 100° C.: 8.2 mm$^2$/s
(*3) KF-96 by Shin-Etsu Chemical Co., Ltd., viscosity: 5000 cSt, dimethyl silicone defoaming agent.
(*4) KF-96 by Shin-Etsu Chemical Co., Ltd., viscosity: 50000 cSt, dimethyl silicone defoaming agent.

(Evaluation of Defoaming Performance of Fresh Oil (1): Homogenizer Test)

Defoaming performance of each of the prepared lubricating oil compositions was evaluated by a homogenizer test machine shown in FIG. 1. The homogenizer test machine shown in FIG. 1 includes a homogenizer 1, a cylindrical heater for heating 2, a temperature adjuster 3, a thermocouple for oil temperature measurement 4, an electric power source for the heater 5, a glass cylinder corresponding to an oil tank 6 (graduated cylindrical glass vessel, 40 mm in inner diameter, 300 mm in depth, 2 mL grading divisions from 0 to 250 mL), and an air blow tube (air blow rate: 30 mL/min) 7.

To the glass cylinder 6, 150 mL of a sample oil was introduced. The temperature of the sample oil was raised to 120° C. by the cylindrical heater for heating 2. An oil surface level at this time was recorded as a reference oil surface level 8. Then the oil was stirred with the homogenizer 1, and the difference between an oil surface level after 10 minutes stirring and the reference oil surface level was recorded as the amount of foaming. The results are shown in Table 2.

(Evaluation of Storage Stability and Durability Against Centrifugal Effect (1): Homogenizer Test)

(a) Centrifugation

Four glass centrifuge tubes filled to the 60 mL graduation mark with sample oil were prepared. These four centrifuge tubes with the sample oil were set in a centrifuge, and rotated at 25° C. at 10,000 rpm for 180 minutes. The relative centrifugal force in this rotation was 8,000 G on average. After the centrifugation, a supernatant (200 mL in total) was collected.

(b) Homogenizer Test

Defoaming performance of the collected supernatant was evaluated by the homogenizer test same as described above. The results are shown in Table 2. It can be said that less increase of the amount of foaming after the centrifugation means a less tendency for the defoaming agent to cause segregation and precipitation during storage, and means less deterioration of defoaming performance due to centrifugal effect.

(Evaluation of Storage Stability and Durability Against Centrifugal Effect (2): Measurement of Silicon Content in Oil)

(a) Measurement of Silicon Content in Fresh Oil

The silicon content in the fresh oil of each of the above prepared lubricating oil compositions was measured by inductively coupled plasma (ICP) atomic emission spectroscopy.

(b) Measurement of Silicon Content in Oil after Centrifugation

Each of the above prepared lubricating oil compositions was subjected to centrifugation in the same way as described above (at 25° C. at 8,000 G for 180 minutes). The silicon content in the oil of the collected supernatant was measured in the same way as described above by ICP atomic emission spectroscopy. It can be said that the silicon content in the oil after the centrifugation closer to that in the fresh oil means a less tendency for the defoaming agent to cause separation and precipitation during storage, and means less loss of the defoaming agent due to centrifugal effect.

As can be seen from Table 2, all the lubricant oil compositions comprising the defoaming agents of the present invention (examples 1 to 8) showed good defoaming performance of the fresh oil, but also of the sample oil after the centrifugation. These lubricating oil compositions of the present invention also showed less decrease of the silicon contents in the oils even after the centrifugation. In contrast, in comparative examples 1 to 5, which used the defoaming agents outside the scope of the present invention, the sample oils after the centrifugation showed significantly deteriorated defoaming performance compared to that of the fresh oils. The silicon contents in the oils of these lubricant oil compositions of the comparative examples significantly decreased after the centrifugation.

The above test results show that the defoaming agent and lubricating oil composition of the present invention can suppress deterioration of defoaming performance even during long-term storage, and can maintain defoaming performance of lubricating oil for a long term even under such lubricating conditions that the lubricating oil is subjected to high centrifugal effect.

INDUSTRIAL APPLICABILITY

The defoaming agent and the lubricating oil composition of the present invention can suppress deterioration of defoaming performance even during long-term storage, and can maintain defoaming performance of lubricating oil for a long term even under such lubricating conditions that the lubricating oil is subjected to high centrifugal effect. Thus, the defoaming agent and the lubricating oil composition of the present invention can be preferably employed for any lubricating oil composition that demands defoaming performance, and among them, can be especially preferably employed in lubricating oil used under such lubricating conditions that the lubricating oil is subjected to high centrifugal effect, for example, in automobile engine oil, automobile transmission oil, or automobile transaxle oil.

REFERENCE SIGNS LIST

1 homogenizer
2 cylindrical heater for heating
3 temperature adjuster
4 thermocouple for oil temperature measurement
5 electric power source for the heater
6 glass cylinder corresponding to an oil tank (graduated cylindrical glass vessel, 40 mm in inner diameter, 300 mm in depth, 2 mL grading divisions from 0 to 250 mL)
7 air blow tube (air blow rate: 30 mL/min)
8 reference oil surface level

We claim:
1. A defoaming agent comprising
a polymer,
the polymer comprising:
a repeating unit represented by the following general formula (1); and
a repeating unit represented by the following general formula (3):

wherein in the general formula (1), $X^1$ is a repeating unit obtainable by polymerization of a first ethylenic unsaturated group; $Y^1$ is a side chain comprising a linear or branched polysiloxane structure, the polysiloxane structure comprising a repeating unit represented by the following general formula (2) and having a polymerization degree of 5 to 300; and $Z^1$ is a linking group linking the repeating unit $X^1$ and the side chain $Y^1$;

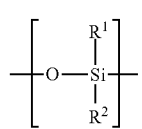

(2)

wherein in the general formula (2), $R^1$ and $R^2$ are each independently an organic group having a carbon number of 1 to 18; and

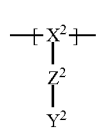

(3)

wherein in the general formula (3), $X^2$ is a repeating unit obtainable by polymerization of a second ethylenic unsaturated group; $Y^2$ is a $C_{1-30}$ hydrocarbyl side chain; and $Z^2$ is a linking group linking the repeating unit $X^2$ and the side chain $Y^2$;
the polymer further comprising a repeating unit represented by the following general formula (4):

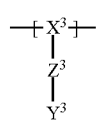

(4)

wherein in the general formula (4), $X^3$ is a repeating unit obtainable by polymerization of a third ethylenic unsaturated group; $Y^3$ is a side chain comprising 3 or more fluorine atoms; and $Z^3$ is a linking group linking the repeating unit $X^3$ and the side chain $Y^3$.

2. The defoaming agent according to claim 1, wherein $X^3$ is a repeating unit obtainable by polymerization of a third (meth)acryloyl group.

3. A defoaming agent comprising
a polymer,
the polymer comprising:
a repeating unit represented by the following general formula (1); and
a repeating unit represented by the following general formula (3):

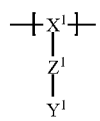

(1)

wherein in the general formula (1), $X^1$ is a repeating unit obtainable by polymerization of a first ethylenic unsaturated group; $Y^1$ is a side chain comprising a linear or branched polysiloxane structure, the polysiloxane structure comprising a repeating unit represented by the following general formula (2) and having a polymerization degree of 5 to 300; and $Z^1$ is a linking group linking the repeating unit $X^1$ and the side chain $Y^1$;

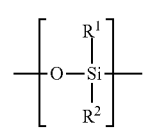

(2)

wherein in the general formula (2), $R^1$ and $R^2$ are each independently an organic group having a carbon number of 1 to 18; and

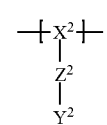

(3)

wherein in the general formula (3), $X^1$ is a repeating unit obtainable by polymerization of a second ethylenic unsaturated group; $Y^2$ is a $C_{1-30}$ hydrocarbyl side chain; and $Z^2$ is a linking group linking the repeating unit $X^1$ and the side chain V;
wherein
$X^1$ is a repeating unit obtainable by polymerization of a second (meth)acryloyl group; and
$X^1$ is a repeating unit obtainable by polymerization of a first (meth)acryloyl group.

4. The defoaming agent according to claim 1, wherein the polymer comprises the repeating unit represented by the general formula (1) in an amount of no less than 10 mass % on the basis of the total mass of all repeating units in the polymer.

5. The defoaming agent according to claim 1, wherein the polymer has a weight average molecular weight of 10,000 to 1,000,000.

6. A lubricating oil composition comprising:
(A) a lubricant base oil; and
(B) the defoaming agent as in claim 1, in an amount of 1 to 100 mass ppm in terms of silicon on the basis of the total mass of the composition.

7. A method for lubricating an automobile engine, an automobile transmission, or an automobile transaxle unit, comprising:
supplying the lubricating oil composition according to claim 6, to an automobile engine, an automobile transmission, or an automobile transaxle unit.

8. The defoaming agent according to claim 3, wherein the polymer comprises the repeating unit represented by the general formula (1) in an amount of no less than 10 mass % on the basis of the total mass of all repeating units in the polymer.

9. The defoaming agent according to claim 3, wherein the polymer has a weight average molecular weight of 10,000 to 1,000,000.

10. A lubricating oil composition comprising:
(A) a lubricant base oil; and
(B) the defoaming agent as in claim 3, in an amount of 1 to 100 mass ppm in terms of silicon on the basis of the total mass of the composition.

11. A method for lubricating an automobile engine, an automobile transmission, or an automobile transaxle unit, comprising:
supplying the lubricating oil composition according to claim 10 to an automobile engine, an automobile transmission, or an automobile transaxle unit.

\* \* \* \* \*